United States Patent
Pingani et al.

(10) Patent No.: US 9,328,844 B2
(45) Date of Patent: May 3, 2016

(54) DETENT MECHANISM FOR A SLIDING VALVE

(71) Applicant: Robert Bosch GmbH, Stuttgart (DE)

(72) Inventors: Davide Pingani, Vezzano (IT); Luca Rovacchi, Reggio Emilia (IT); Vincenzo Bollero, Gorgonzola (IT); Loris Rosselli, San Polo (IT)

(73) Assignee: Robert Bosch GmbH, Stuttgart (DE)

( * ) Notice: Subject to any disclaimer, the term of this patent is extended or adjusted under 35 U.S.C. 154(b) by 235 days.

(21) Appl. No.: 13/901,810

(22) Filed: May 24, 2013

(65) Prior Publication Data

US 2013/0319168 A1    Dec. 5, 2013

(30) Foreign Application Priority Data

May 29, 2012    (DE) .......................... 10 2012 208 943

(51) Int. Cl.
*F16K 11/07*    (2006.01)
*F16K 31/56*    (2006.01)

(52) U.S. Cl.
CPC ............. *F16K 31/56* (2013.01); *F16K 11/0704* (2013.01); *Y10T 74/20636* (2015.01)

(58) Field of Classification Search
CPC ................ F16K 31/56; F16K 11/0704; Y10T 74/20636; F15B 13/01; F15B 15/26; F15B 11/003; F15B 13/015

USPC .................................. 251/75, 89, 90, 65, 297
See application file for complete search history.

(56) References Cited

U.S. PATENT DOCUMENTS

| 2,329,743 | A | * | 9/1943 | Cameron | 188/171 |
| 3,011,519 | A | * | 12/1961 | Abbott et al. | 137/624.27 |
| 3,823,739 | A | * | 7/1974 | McMullan | 137/624.27 |

FOREIGN PATENT DOCUMENTS

| DE | 4401485 A1 | * | 7/1995 | .............. F15B 13/02 |
| EP | 0 751 302 B1 | | 1/1997 | |

* cited by examiner

*Primary Examiner* — Marina Tietjen
(74) *Attorney, Agent, or Firm* — Maginot, Moore & Beck LLP

(57) ABSTRACT

A detent mechanism is provided for a sliding valve which includes a valve slide that is accommodated within a valve housing and is linearly movable relative to a longitudinal axis. The detent mechanism has a linearly movable detent element configured to engage at least one detent notch. The detent notch is coupled with the valve slide such that when the detent element is locked into the detent notch, said valve slide is fixed along the longitudinal axis. A first spring prestresses the detent element in a direction of the detent notch. The detent element includes a permanent magnet or a ferromagnet and the detent mechanism includes an electric coil configured to generate a magnetic field. The detent element is configured to be moved in opposition to the prestressing force of the first spring and out of engagement with the detent notch via the magnet and magnetic field.

10 Claims, 3 Drawing Sheets

DETENT MECHANISM FOR A SLIDING VALVE

This application claims priority under 35 U.S.C. §119 to patent application no. DE 10 2012 208 943.8, filed on May 29, 2012 in Germany, the disclosure of which is incorporated herein by reference in its entirety.

BACKGROUND

The disclosure relates to a detent mechanism for a sliding valve according to the description below.

In the case of sliding valves—in particular in the case of directional control valves—pressure medium connections are controlled by means of positions along a longitudinal axis of a valve slide. To this end, the valve slide is movable in a valve housing, for example by means of electromagnets. Springs, which press the valve slide into its initial position along the longitudinal axis, are often used for centering. For reasons of safety it can be necessary to secure switching positions taken up by the valve slide or the initial position thereof in a mechanical manner. It is known from the prior art to provide detent mechanisms for this purpose.

Patent EP 0 751 302 B1 shows a detent mechanism for a valve slide of a sliding valve. In this case, a detent strip is fastened to the valve slide and is aligned along a longitudinal axis or direction of displacement of the valve slide. Detent notches are provided spaced apart from one another in the direction of displacement. A detent element, which is inserted into the respective detent notch, can be moved transversely thereto by means of a pressure medium cylinder. The pressure medium cylinder is controlled by means of an electrically actuated valve.

A disadvantage of these types of detent mechanisms for sliding valves is the amount of expenditure on the technical mechanism which is produced from the pressure medium cylinder and the electrically actuated valve.

Accordingly, the object underlying the disclosure is to create a detent mechanism for a sliding valve with a simplified technical mechanism.

SUMMARY

Said object is achieved by a detent mechanism for a sliding valve with the features described below.

The detent device according to the disclosure serves for locking a valve slide which is accommodated in a valve housing of a sliding valve. The detent mechanism according to the disclosure has a—preferably linearly movable—detent element which is able to engage directly or indirectly in a positive locking manner in at least one detent notch. In this case, the at least one detent notch is coupled with the valve slide such that said valve slide is fixed along the longitudinal axis or is no longer able to be moved in relation to the valve housing when the detent element is locked into the at least one detent notch. A first spring prestresses the detent element in the direction of the detent notch. In this case, the detent element includes a permanent magnet or a ferromagnet and the detent mechanism includes an electric coil which is able to generate a magnetic field, by way of which the detent element is able to be moved against the prestressing force of the first spring and out of engagement with the at least one detent notch.

Further advantageous developments of the disclosure are described below.

The detent mechanism preferably includes a detent housing in which a detent slide is accommodated so as to be linearly movable with reference to a longitudinal axis, wherein the at least one detent notch is provided on the detent slide. The detent housing can then be placed in a modular manner onto the valve housing. The detent slide can be pushed onto the valve slide or onto a plunger fastened thereon as a rotationally symmetrical part and can be secured by means of a nut against a radial collar of the valve slide or of the plunger.

In the case of a preferred further development, the valve housing has a first and a second internal thread for connection of a polar tube, wherein the first and the second internal thread are arranged in a concentric manner with reference to the longitudinal axis on the opposite sides of the valve housing. In addition, the detent housing has an external thread which is realized for engagement with the first or the second internal thread on the valve housing, wherein an internal thread, which is realized in a complementary manner to the external thread and is arranged in a concentric manner with respect to the longitudinal axis, is provided opposite the external thread on the detent housing.

Consequently the polar tube, which is realized for fastening on the valve housing, can instead simply be fastened on the detent housing.

In order to be able to adjust the position of the connection of the coil or of the polar tube, it is preferred when the detent housing has at least one first and one second housing part, wherein the detent slide is guided exclusively on the first housing part with reference to the longitudinal axis. The external thread is provided on the second housing part, wherein the first and the second housing part are connected to at least one screw bolt which penetrates the first housing part and can be screwed in from the side of the internal thread.

The second housing part is preferably rotationally symmetrical, wherein there is provided a third housing part which is associated with the detent housing and which engages around the second housing part, wherein the at least one screw bolt can be screwed into the third housing part. Consequently, the position of the connection of the coil or of the polar tube can be infinitely adjusted in order to compensate for the unforeseeable screw-in depth of the second housing part.

The valve slide is preferably clamped along the longitudinal axis between a second spring and a third spring. The second spring is clamped between the second housing part and the valve slide. In the case of the sliding valve, the second spring is arranged in the polar tube without the detent mechanism according to the disclosure and can be placed at this position when the sliding valve is retro-fitted.

The assembly of the detent mechanism according to the disclosure is particularly flexible when the at least one detent notch is rotationally symmetrical with reference to the longitudinal axis.

The fixing of the valve slide by means of the detent mechanism according to the disclosure is particularly secure when the at least one detent notch has flanks arranged at right angles to the longitudinal axis—preferably a rectangular cross sectional profile, wherein the detent element is adapted to the detent notch. It is then not possible for the detent element to be moved out of detent engagement by a force acting in the direction of the longitudinal axis.

As the permanent magnet or the ferromagnet would wear out should it engage directly in the detent notch, it is preferred when the detent element includes a separate detent nose of steel which is able to engage in the at least one detent notch. The detent nose is then fixedly connected to the permanent magnet or the ferromagnet, preferably screw-connected thereto.

To be able to use coils which are already present for actuating the valve slide to actuate the detent slide, it is preferred when the detent element is accommodated in a separate detent tube which has a tightly sealed end and an opposite open end, and when the detent tube is fixedly connected—preferably screw connected—to the detent housing at the open end. In this case, the permanent magnet or the ferromagnet is guided in a slidingly movable manner on the inside surface of the detent tube, wherein the coil surrounds the detent tube.

In order to enable movement of the detent element also in opposition to an oil pressure acting in the detent housing, it is preferred when the detent element has at least one pressure compensation passage. Said pressure compensation passage penetrates the detent element in the direction of extension of the detent tube.

BRIEF DESCRIPTION OF THE DRAWINGS

An exemplary embodiment of the disclosure is described below by way of the Figures, in which, in detail.

DETAILED DESCRIPTION

Figure 1:
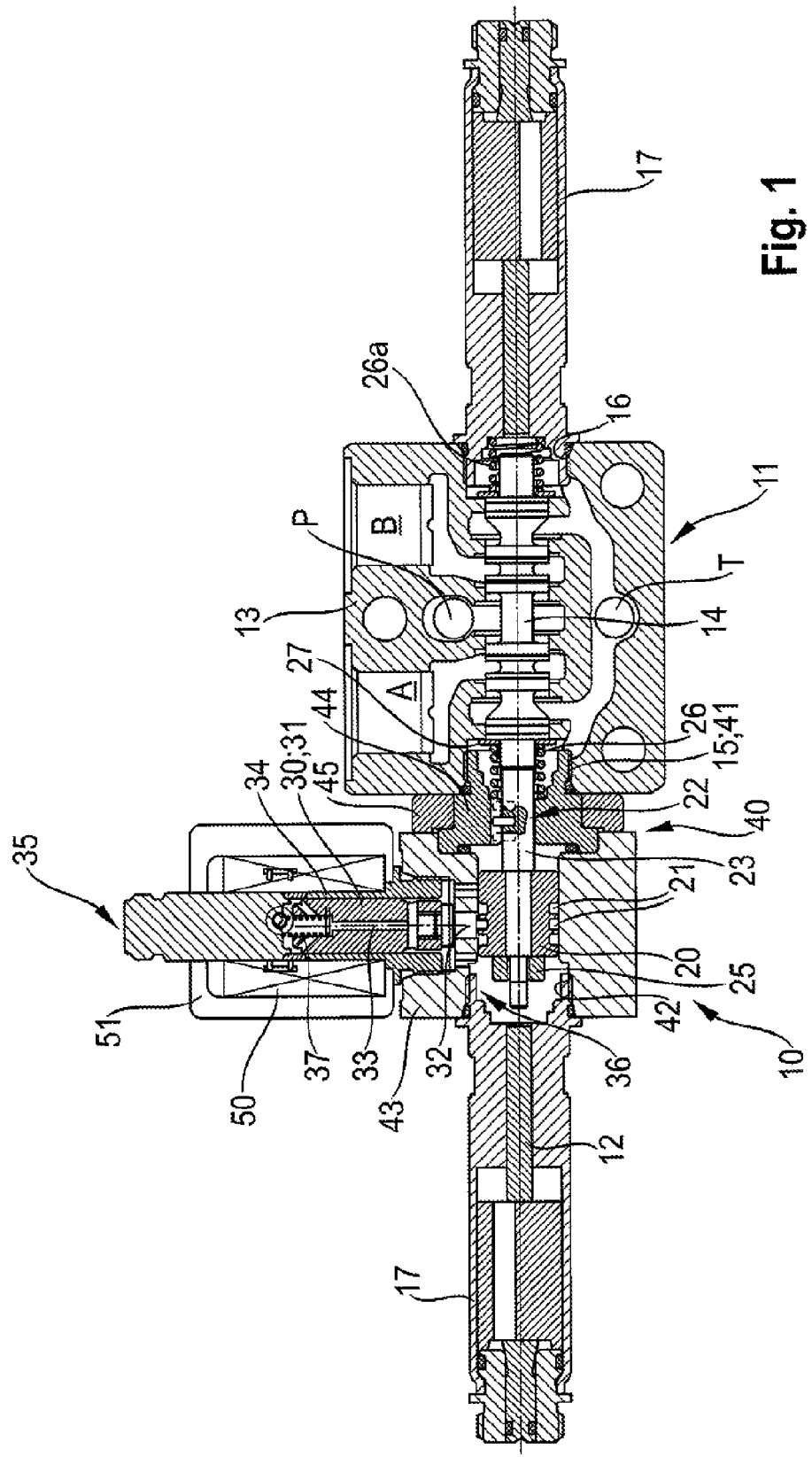
FIG. 1 shows a lateral section of the exemplary embodiment of the detent mechanism according to the disclosure with a sliding valve.

FIG. 1 shows the exemplary embodiment of the detent mechanism 10 according to the disclosure with a sliding valve 11. The sliding valve 11 has a valve housing 13, on which two operating connections A, B, a pump connection P and a tank connection T are provided. A valve slide 14 can be moved along a longitudinal axis 12 from the initial position shown in FIG. 1 into two switching positions arranged laterally thereof such that the sliding valve 11 is a 4/3 port directional control valve. By moving the valve slide 14 (in FIG. 1) to the left, the pump connection P is connected to the operating connection A, whilst the operating connection B is discharged to the tank connection T. When the valve slide 14 (in FIG. 1) is moved in the opposite direction to the right, the pump connection P is connected to the operating connection B, whilst the operating connection A is discharged to the tank connection T.

Polar tubes 17 are provided on both sides of the valve slider 14 for the movement thereof, the polar tube 17 on the right (in FIG. 1) being screwed directly into an internal thread 16 of the valve housing 13, whilst the polar tube 17 on the left (in FIG. 1) is fastened indirectly to the valve housing 13 by means of a detent housing 40. In this case, the detent housing 40 is screwed into an internal thread 15 of the valve housing 13 by means of an external thread 41, the first internal thread 15 corresponding in principle to the second internal thread 16. The detent housing 40, in turn, has an internal thread 42 which corresponds to the two internal threads 15, 16 of the valve housing 13. Consequently, the polar tube 17 on the left (in FIG. 1) can be used as an unchanged component—corresponding to the polar tube 17 on the right—if the detent mechanism 10 on the slider valve 11 were to be supplemented.

Looked at in more detail, the detent housing 40 has a first housing part 43, a second housing part 44 which is provided between the first housing part 43 and the valve housing 13, and a third housing part 45 which engages around the second housing part 44. In this case, the external thread 41, by means of which the detent housing 40 is fastened on the valve housing 13, is realized on the second housing part 44.

A plunger 23, which extends along the longitudinal axis 12 through the three housing parts 43, 44, 45 of the detent housing 40 as far as into the vicinity of the polar tube 17 on the left (in FIG. 1), is realized integrally on the valve slide 14 such that the valve slide 14 is able to be attracted in an electromagnetic manner by the left-hand polar tube 17 by means of the plunger 23. In this case, a bush-like or sleeve-like detent slide 20 is pushed onto the plunger 23 and tightened by way of a nut 25 against radial expansion of the plunger 23. The detent slide 20 is accommodated so as to be displaceable along the longitudinal axis 12 in the first housing part 43 of the detent housing 40. Three detent notches 21, which are realized as circumferential grooves, are provided on the outside periphery of the detent slide 20.

FIG. 1 shows the valve slide 14 in its middle initial position centered by two springs 26, 26a, in which position all the connections A, B, P, T are separated from one another. Accordingly, the detent slide 20 is also in its middle position. In this case, in the radial direction (from top to bottom in FIG. 1) a detent nose 32 is guided or inserted into the middle detent notch 21 such that the valve slide 14 is fixed in a positive locking manner in the initial position. The two lateral detent notches 21 are at the same spacing from the middle detent notch along the longitudinal axis 12, just as the switching positions of the valve slide 14 from its initial position.

Before the valve slide 14 is able to be switched into a switching position by means of one of the two polar tubes 17, the detent nose 32 has to be pulled out of the detent notch 21 in a radial manner or raised in FIG. 1 by means of an electric coil 50 and a permanent magnet or a ferromagnet 31. In this case, the permanent magnet or the ferromagnet 31 is accommodated in a detent tube 34 which is engaged around by the coil 50 and by a connection housing 51. The detent tube 34 is screwed into the first housing part 43 by way of its open end 36. A spring 37, by means of which the detent nose 32 is pushed in the direction of the detent notches 21, is clamped between the permanent magnet or the ferromagnet 31 and the detent tube 34 such that the detent mechanism 10 according to the disclosure is 'normally locked'. Accordingly, the coil 50 has to be supplied with current in order to unlock the detent mechanism 10 according to the disclosure.

An optional anti-twist means 22 is arranged between the plunger 23 and the third housing part 45. If the valve slide 14 is rotationally symmetrical with the plunger 23 and the detent slide 20 is rotationally symmetrical with the circumferential grooves 21, the anti-twist means can be omitted.

Figure 2:
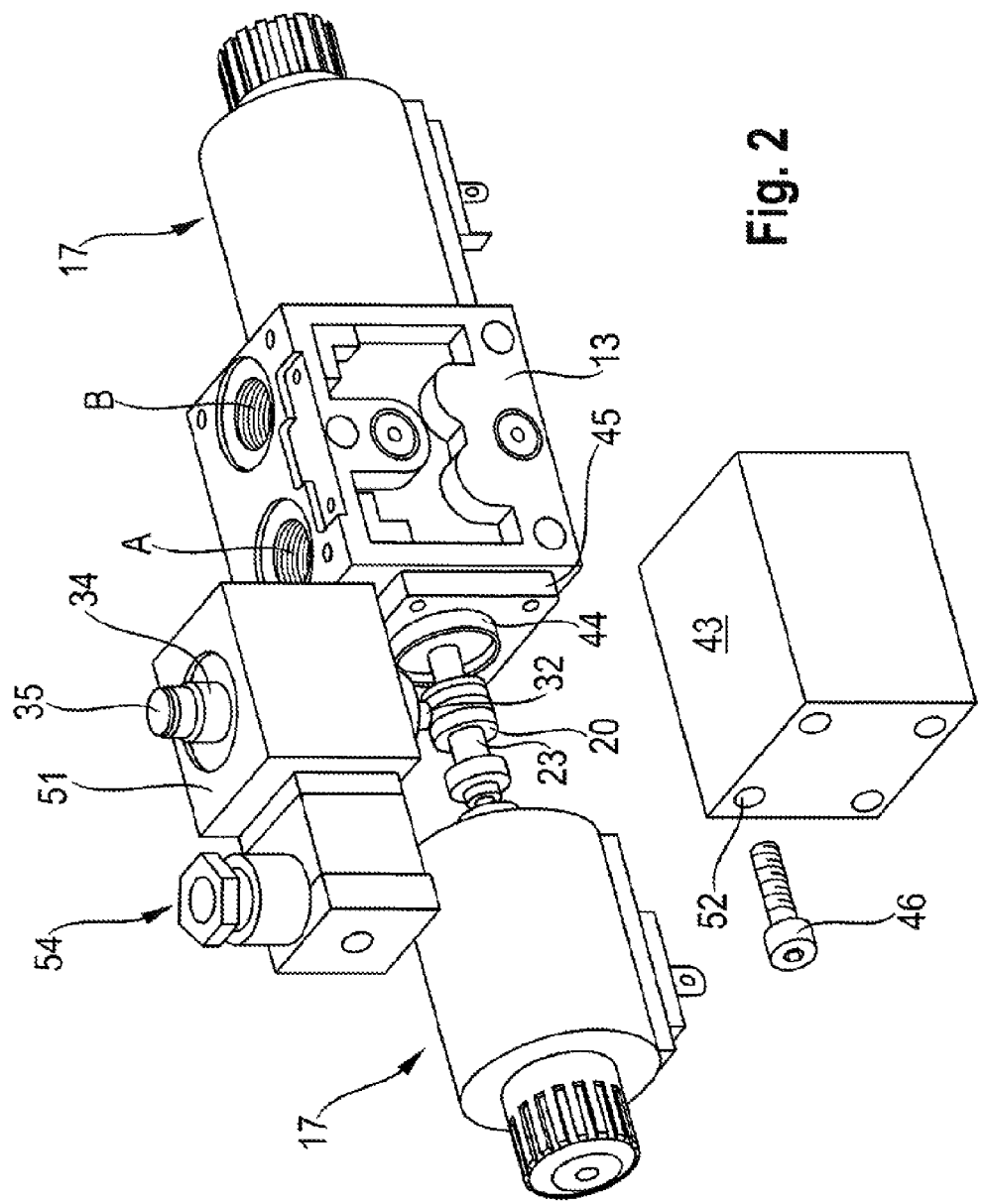
FIG. 2 shows a perspective view of the exemplary embodiment according to FIG. 1.

FIG. 2 shows a perspective view of the exemplary embodiment according to FIG. 1. In this case, the valve housing 13 is shown with the two operating connections A, B. In addition, the two lateral polar tubes 17, which serve for displacing the valve slide 14 (not shown in FIG. 2) including the plunger 23 and the detent slide 20, can also be seen.

In FIG. 2 the first housing part 43, which engages around the detent slide 20 in particular, is shown at a spacing from said detent slide. In this case, it can be seen that the first housing part 43 has four axial passage recesses 52. Four screw bolts 46, only one screw bolt 46 of which is shown in FIG. 2, are provided accordingly. Said screw bolts are screwed into the third housing part 45, as a result of which a radial collar of the second housing part 44, shown in FIG. 2, is clamped between the first housing part 43 and the second housing part 45.

In addition, the detent nose 32, the connection housing 51 and a closed end 35 of the detent tube 34 can be seen in FIG. 2. In addition to FIG. 1, FIG. 1 also shows an electric connection 54, by means of which the electric coil 50 (cf. FIG. 1) is supplied with current for unlocking the detent mechanism 10 according to the disclosure.

Figure 3:
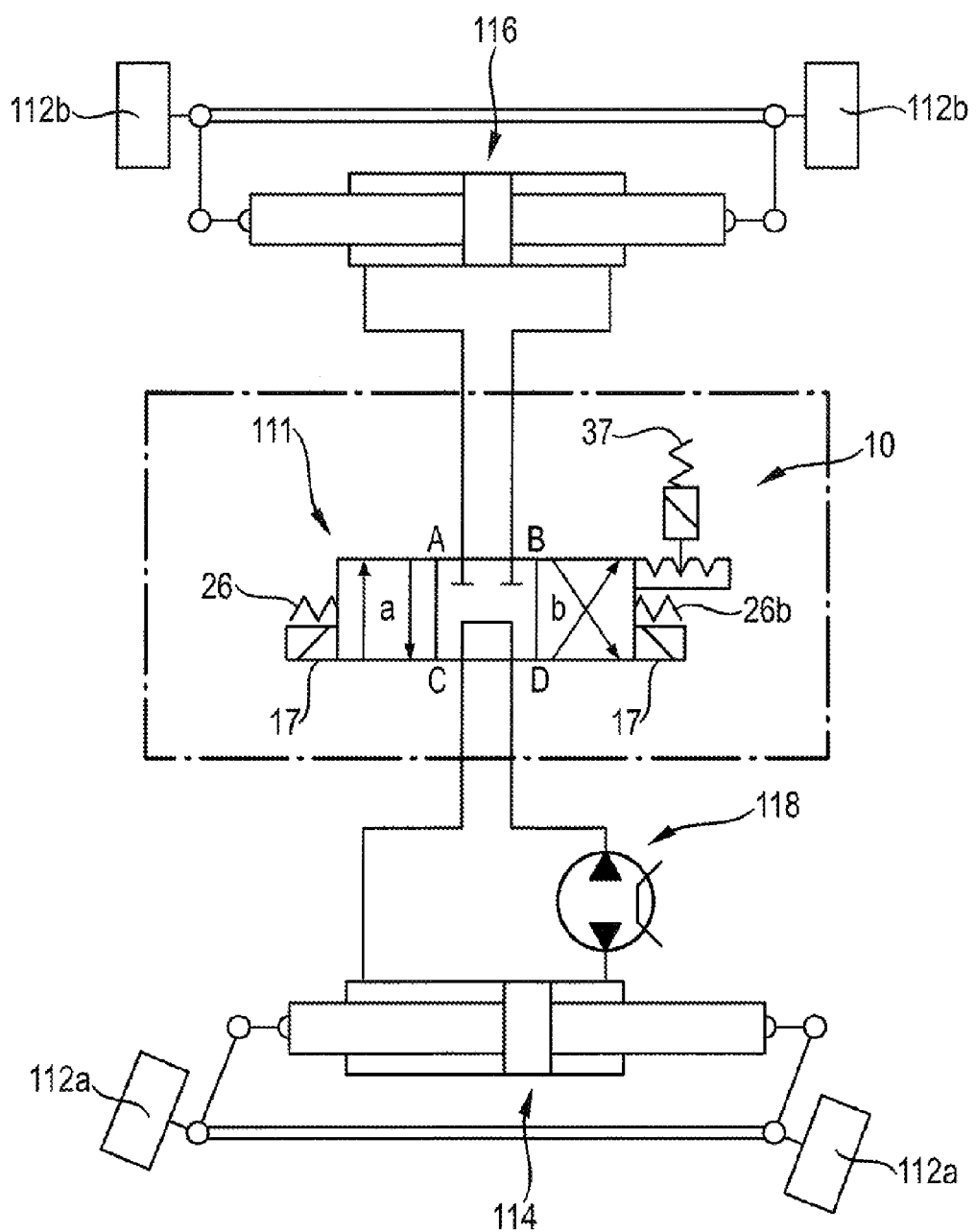
FIG. 3 shows an application of the sliding valve with the detent mechanism according to the disclosure.

FIG. 3 shows an example of an application of a sliding valve 111 with the detent mechanism 10 according to the disclosure according to FIGS. 1 and 2. The sliding valve 111 is realized as a 4/3 port directional control valve which serves to select a steering mode of a vehicle. The vehicle has four wheels 112a, 112b, the two front wheels 112a being steerable by means of a front steering cylinder 114 and the two rear wheels 112b being steerable by means of a rear steering cylinder 116. The two steering cylinders 114, 116 are realized as synchronizing cylinders, two pressure spaces of the rear steering cylinder 116 being connected to the two operating connections A, B of the sliding valve 111, whilst the two pressure spaces of the front steering cylinder 114 are connected to the two operating connections C, D of the sliding valve 111.

In an initial position of the valve slide, which is prestressed by the two springs 26, 26a and is shown in FIG. 3, the two operating connections A, B are blocked off, whilst the two operating connections C, D are connected together. In a first switching position a of the sliding valve 111, the operating connection A is connected to the operating connection C and the operating connection B is connected to the operating connection D. In a second switching position b of the sliding valve 111, the operating connection A is connected to the operating connection D and the operating connection B is connected to the operating connection C.

A metering unit 118, by means of which the pressure medium can be selectively conveyed to the operating connection D or to the first pressure space of the front steering cylinder 114, is provided between the operating connection D and one of the two pressure spaces of the front steering cylinder 114. The metering unit 118 has a steering valve which is actuated in dependence on a steering wheel. In addition, the metering unit 118 has a pump and a tank connection (not shown).

The sliding valve 111 provided with the detent mechanism 10 according to the disclosure serves to select a steering mode. In the middle initial position, which is prestressed by the springs 26, 26a and is shown in FIG. 3, the two front wheels 112a are steered simply by means of the front steering cylinder 114 when the metering device 118 is activated. In this case, either the first or the second pressure space of the front steering cylinder 114 is supplied with pressure medium by the metering unit 118, whilst the displaced pressure medium flows back to the metering unit 118 from the other pressure space. The rear steering cylinder 116, in this case, is fixed in the middle position shown in FIG. 3 as its two pressure spaces are blocked off in each case by means of the two operating connections A, B of the sliding valve 111.

The first switching position a allows for a so-called "crab-steering" mode where the two rear wheels 112b are steered in the same direction or parallel to the two front wheels 112a. As a result, the vehicle is able to be moved in a straight line in a direction which is set in an inclined manner with respect to a vehicle longitudinal axis.

The switching position b allows for a so-called "all wheel steering" mode where the two rear wheels 112b are steered counter to the two front wheels 112a. As a result, the tail of the vehicle is guided along the same curved path as the front of the vehicle such that the vehicle longitudinal axis is aligned for instance tangentially with respect to the curved path.

The valve slide 14 (cf. FIG. 1) is switched depending on the mode desired and is then locked by means of the detent mechanism according to the disclosure 10, the spring 37 always maintaining the detent even when the coil 50 is not supplied with current and preventing inadvertent reversal of the steering mode.

Disclosed is a detent mechanism for a sliding valve which includes a valve housing in which a valve slide is accommodated so as to be linearly movable with reference to a longitudinal axis. The detent mechanism has a—preferably linearly movable—detent element which is able to engage directly or indirectly in a positive locking manner in at least one detent notch. In this case, the at least one detent notch is coupled with the valve slide such that said valve slide is fixed along the longitudinal axis or is no longer able to be moved in relation to the valve housing when the detent element is locked into the at least one detent notch. A first spring prestresses the detent element in the direction of the detent notch. In this case, the detent element includes a permanent magnet or a ferromagnet and the detent mechanism includes an electric coil which is able to generate a magnetic field, by way of which the detent element is able to be moved against the prestressing force of the first spring and out of engagement with the at least one detent notch.

LIST OF REFERENCES

10 Detent mechanism
11; 111 Sliding valve
12 Longitudinal axis
13 Valve housing
14 Valve slide
15 First internal thread
16 Second internal thread
17 Polar tube
20 Detent slide
21 Detent notch
22 Anti-twist means
23 Plunger
25 Nut
26 Second spring
26a Third spring
27 Washer
30 Detent element
31 Permanent magnet or ferromagnet
32 Detent nose
33 Pressure compensation passage
34 Detent tube
35 Closed end
36 Open end
37 First spring
40 Detent housing
41 External thread
42 Internal thread
43 First housing part
44 Second housing part
45 Third housing part
46 Screw bolt
50 Electric coil
51 Connection housing
52 Passage recess
54 Electric connection
112a Front wheel
112b Rear wheel
114 Front steering cylinder
116 Rear steering cylinder
118 Metering unit
a, b Switching position
A, B, C, D Operating connection
P Pump connection
T Tank connection

What is claimed is:

1. A detent mechanism for a sliding valve including a valve housing in which a valve slide is accommodated so as to be linearly movable with reference to a longitudinal axis, the detent mechanism comprising:
   a detent slide defining at least one detent notch that is coupled with the valve slide;
   a detent housing configured to accommodate the detent slide such that the detent slide is linearly movable relative to the longitudinal axis
   a detent element configured to engage the at least one detent notch in a positive locking manner such that said valve slide is fixed along the longitudinal axis, the detent element including a permanent magnet or a ferromagnet;
   a first spring configured to prestress the detent element toward the detent notch; and
   an electric coil configured to generate a magnetic field to move the detent element in opposition to a prestressing force of the first spring and out of engagement with the at least one detent notch,
   wherein:
      the valve housing has a first internal thread and a second internal thread configured to connect a polar tube,
      the first internal thread and the second internal thread are arranged in a concentric manner relative to the longitudinal axis on opposite sides of the valve housing,
      the detent housing has an external thread configured to engage with one of the first internal thread and the second internal thread on the valve housing,
      the detent housing has an internal thread configured in a complementary manner relative to the external thread and arranged concentrically relative to the longitudinal axis, and
      the internal thread is provided opposite the external thread on the detent housing
   wherein the detent housing has at least one first housing part and one second housing part,
   wherein the detent slide is guided exclusively on the first housing part relative to the longitudinal axis,
   wherein the external thread is provided on the second housing part, and
   wherein the first housing part and the second housing part are connected to at least one screw bolt configured to penetrate the first housing part and configured to be screwed in from the internal thread.

2. The detent mechanism according to claim 1, further comprising:
   a third housing part configured to engage around the second housing part,
   wherein the second housing part is rotationally symmetrical, and
   wherein the at least one screw bolt is configured to be screwed into the third housing part.

3. The detent mechanism according to claim 1, further comprising a second spring supported on the second housing part and arranged between the second housing part and the valve slide.

4. The detent mechanism according to claim 1, wherein the at least one detent notch is rotationally symmetrical relative to the longitudinal axis.

5. The detent mechanism according to claim 1, wherein:
   the at least one detent notch includes flanks arranged at right angles relative to the longitudinal axis, and
   the detent element is configured to be engaged in the detent notch.

6. The detent mechanism according to claim 1, further comprising a separate detent nose of steel configured to engage in the at least one detent notch, the detent nose being fixedly connected to the permanent magnet or the ferromagnet.

7. The detent mechanism according to claim 2, further comprising:
   a separate detent tube configured to accommodate the detent element, the detent tube including a tightly sealed end and an opposite open end,
   wherein the detent tube is fixedly connected to the detent housing at the open end,
   wherein the permanent magnet or ferromagnet is guided so as to be slidingly movable on an inside surface of the detent tube, and
   wherein the coil surrounds the detent tube.

8. The detent mechanism according to claim 7, wherein the detent element includes at least one pressure compensation passage configured to penetrate the detent element in a direction of extension of the detent tube.

9. The detent mechanism according to claim 2, wherein:
   the detent slide is separate from the valve slide;
   the detent housing is separate from the valve housing; and
   the detent housing, the detent slide and the valve slide are configured to be selectively positioned in the valve housing.

10. The detent mechanism according to claim 1, wherein the detent slide is positioned at an end of the valve slide.

* * * * *